United States Patent
Hyun et al.

(10) Patent No.: US 11,997,366 B2
(45) Date of Patent: May 28, 2024

(54) METHOD AND APPARATUS FOR PROCESSING ADAPTIVE MULTI-VIEW STREAMING

(71) Applicant: ELECTRONICS AND TELECOMMUNICATIONS RESEARCH INSTITUTE, Daejeon (KR)

(72) Inventors: Eun Hee Hyun, Daejeon (KR); Kwan Woong Ryu, Daejeon (KR); Je Won Lee, Daejeon (KR); Joon Young Jung, Daejeon (KR); Dong Joon Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/895,973

(22) Filed: Aug. 25, 2022

(65) Prior Publication Data
US 2023/0199267 A1 Jun. 22, 2023

(30) Foreign Application Priority Data
Dec. 21, 2021 (KR) .................. 10-2021-0184044

(51) Int. Cl.
*H04N 21/6373* (2011.01)
*H04N 21/218* (2011.01)
(Continued)

(52) U.S. Cl.
CPC ... *H04N 21/6373* (2013.01); *H04N 21/21805* (2013.01); *H04N 21/23805* (2013.01);
(Continued)

(58) Field of Classification Search
CPC ....... H04N 21/21805; H04N 21/23439; H04N 21/2365; H04N 21/23805; H04N 21/2385;
(Continued)

(56) References Cited

U.S. PATENT DOCUMENTS 6,665,705 B1 * 12/2003 Daniels-Barnes ............... H04L 67/5682 709/213
8,014,393 B1 * 9/2011 Faheem .................. H04L 47/15 370/468

(Continued)

FOREIGN PATENT DOCUMENTS

KR 10-1182518 B1 9/2012
KR 10-1350915 B1 2/2014
(Continued)

OTHER PUBLICATIONS

The Request for the Submission of an Opinion for Korean Patent Application No. 10-2021-0184044, dated Feb. 19, 2024.
(Continued)

*Primary Examiner* — Michael B. Pierorazio

(57) ABSTRACT

An adaptive multi-view streaming processing method and apparatus for a multi-view stream is disclosed. Specifically, disclosed herein is a method and apparatus for adaptively processing or transmitting adaptive streaming by reflecting network states and changes in transmission environments in a multi-view streaming service environment where several or more multiple videos are simultaneously transmitted at an arbitrary moment. An adaptive streaming processing method for a multi-view stream may comprise selecting and downloading an i-th segment of a main view stream with a first quality level, inferring a size of an i-th segment of downloadable neighboring view streams based on a download time and transfer rate of the i-th segment of the main view
(Continued)

stream, and selecting a second quality level corresponding to the inferred size of the i-th segment of the neighboring view streams and downloading the i-th segment of the neighboring view streams based on the selected second quality level.

16 Claims, 11 Drawing Sheets

(51) Int. Cl.
    *H04N 21/238*     (2011.01)
    *H04N 21/239*     (2011.01)
    *H04N 21/24*     (2011.01)
    *H04N 21/437*     (2011.01)

(52) U.S. Cl.
    CPC ..... *H04N 21/2393* (2013.01); *H04N 21/2402* (2013.01); *H04N 21/437* (2013.01)

(58) Field of Classification Search
    CPC ........... H04N 21/2393; H04N 21/2402; H04N 21/26233; H04N 21/437; H04N 21/6373; H04N 21/816; H04N 21/8456
    See application file for complete search history.

(56) References Cited

U.S. PATENT DOCUMENTS

| | | | | |
|---|---|---|---|---|
| 8,135,040 | B2* | 3/2012 | Cuijpers | H04N 21/4384 |
| | | | | 725/90 |
| 8,514,891 | B2* | 8/2013 | Green | H04L 65/765 |
| | | | | 725/86 |
| 8,887,214 | B1* | 11/2014 | Black | H04N 21/64322 |
| | | | | 725/86 |
| 9,219,940 | B2* | 12/2015 | Gaillard | H04N 21/6405 |
| 9,264,508 | B2* | 2/2016 | Wolf | H04N 21/4384 |
| 9,628,405 | B2* | 4/2017 | Dasher | H04N 21/2662 |
| 9,888,278 | B2* | 2/2018 | Phillips | H04W 4/24 |
| 10,104,413 | B2* | 10/2018 | Phillips | H04N 21/23605 |
| 10,615,907 | B2* | 4/2020 | Cho | H04L 1/0002 |
| 10,728,591 | B2* | 7/2020 | Bae | H04L 65/65 |
| 10,939,153 | B2* | 3/2021 | Phillips | H04L 12/14 |
| 11,166,072 | B2* | 11/2021 | He | G06F 1/163 |
| 11,611,799 | B2* | 3/2023 | Goldberg | H04N 21/4384 |
| 2002/0166124 | A1* | 11/2002 | Gurantz | H04N 21/615 |
| | | | | 725/78 |
| 2004/0148421 | A1* | 7/2004 | Achtermann | H04L 12/1886 |
| | | | | 709/223 |
| 2004/0210944 | A1* | 10/2004 | Brassil | H04N 21/23424 |
| | | | | 725/135 |
| 2004/0244058 | A1* | 12/2004 | Carlucci | H04N 7/17327 |
| | | | | 348/E7.071 |
| 2008/0037420 | A1* | 2/2008 | Tang | H04L 69/163 |
| | | | | 370/231 |
| 2008/0098420 | A1* | 4/2008 | Khivesara | G06Q 30/02 |
| | | | | 725/32 |
| 2009/0025027 | A1* | 1/2009 | Craner | H04N 21/2385 |
| | | | | 725/116 |
| 2009/0100489 | A1* | 4/2009 | Strothmann | H04N 5/76 |
| | | | | 725/114 |
| 2009/0150943 | A1* | 6/2009 | Vasudevan | H04N 21/6405 |
| | | | | 725/86 |
| 2010/0086020 | A1* | 4/2010 | Schlack | H04L 67/61 |
| | | | | 375/240.01 |
| 2010/0131969 | A1* | 5/2010 | Tidwell | H04N 21/4667 |
| | | | | 725/93 |
| 2010/0169916 | A1* | 7/2010 | Stettner | H04N 21/4532 |
| | | | | 725/34 |
| 2011/0096713 | A1* | 4/2011 | Rusert | H04N 21/6405 |
| | | | | 370/312 |
| 2011/0107379 | A1* | 5/2011 | Lajoie | H04L 65/612 |
| | | | | 725/151 |
| 2011/0126248 | A1* | 5/2011 | Fisher | H04N 21/26216 |
| | | | | 725/95 |
| 2011/0188439 | A1* | 8/2011 | Mao | H04N 21/6405 |
| | | | | 370/312 |
| 2011/0197239 | A1* | 8/2011 | Schlack | H04N 21/6408 |
| | | | | 725/95 |
| 2011/0302320 | A1* | 12/2011 | Dunstan | H04L 12/185 |
| | | | | 370/252 |
| 2012/0331513 | A1* | 12/2012 | Yamagishi | H04N 21/2362 |
| | | | | 725/95 |
| 2013/0007226 | A1* | 1/2013 | White | H04N 21/4383 |
| | | | | 709/219 |
| 2013/0091521 | A1* | 4/2013 | Phillips | H04N 21/23424 |
| | | | | 725/35 |
| 2013/0160047 | A1* | 6/2013 | DuBose | H04N 21/26258 |
| | | | | 725/32 |
| 2014/0020037 | A1* | 1/2014 | Hybertson | H04N 21/2365 |
| | | | | 725/109 |
| 2014/0143823 | A1* | 5/2014 | Manchester | H04L 65/80 |
| | | | | 725/116 |
| 2014/0282777 | A1* | 9/2014 | Gonder | H04N 21/2225 |
| | | | | 725/116 |
| 2014/0282784 | A1* | 9/2014 | Pfeffer | H04N 21/26616 |
| | | | | 725/112 |
| 2018/0198835 | A1 | 7/2018 | Hurst | |
| 2021/0409818 | A1* | 12/2021 | Bouazizi | H04L 65/60 |
| 2022/0217314 | A1* | 7/2022 | Oh | H04N 21/44 |
| 2022/0272413 | A1* | 8/2022 | Hallmarker | H04L 65/612 |
| 2022/0353317 | A1* | 11/2022 | Wang | H04N 21/4621 |

FOREIGN PATENT DOCUMENTS

| | | |
|---|---|---|
| KR | 10-2016-0147946 A | 12/2016 |
| KR | 10-1923486 B1 | 11/2018 |

OTHER PUBLICATIONS

Chao Yao et al., "Video Streaming Adaptation Strategy for Multiview Navigation Over Dash", IEEE, 2018.

* cited by examiner

FIG. 4

| 1 | 2 | 3 | 4 | 5 |
|---|---|---|---|---|
| 6 | 7 $Sv_1$ | 8 $Sv_2$ | 9 $Sv_3$ | 10 |
| 11 | 12 $Sv_4$ | 13 $Mv$ | 14 $Sv_5$ | 15 |
| 16 | 17 $Sv_6$ | 18 $Sv_7$ | 19 $Sv_8$ | 20 |
| 21 | 22 | 23 | 24 | 25 |

212, 211

METHOD AND APPARATUS FOR PROCESSING ADAPTIVE MULTI-VIEW STREAMING

CROSS REFERENCE TO RELATED APPLICATION

The present application claims priority to Korean Patent Application No. 10-2021-0184044 filed Dec. 21, 2021, the entire contents of which is incorporated herein for all purposes by this reference

BACKGROUND OF THE INVENTION

1. Field of the Invention

The present disclosure relates to an adaptive multi-view streaming processing method and apparatus for a multi-view stream. More particularly, the present disclosure relates to a method and apparatus for adaptively processing or transmitting adaptive streaming by reflecting network states and changes in transmission environments in a multi-view streaming service environment where several or more multiple videos are simultaneously transmitted at an arbitrary moment.

2. Description of the Related Art

A paradigm called HTTP adaptive streaming (HAS) proposed to provide video services with the highest quality of experience (QoE) over the Internet treats media content like normal web content and transmits it through a HTTP protocol in units of small fragments. HAS has quickly become the dominant approach in the video streaming field due to leading adoption by service and content providers after the advent thereof. However, as various provides propose and apply their own unique HAS methods, service platforms for providing streaming services have to accept all of various methods. Therefore, in order to solve this burden, standardization work for HTTP-based Dynamic Adaptive Streaming over HTTP (DASH) has been progressed and completed, and the standardized method is currently being adopted in many fields to expand the scope of application.

In this regard, FIG. 1 shows the principle of operation in a general HTTP adaptive streaming system. A server 110 of FIG. 1 divides a video into segments having a short length (e.g., segments of several seconds or a segment consisting of a set of chunks of tens or hundreds of milliseconds), and each segment is coded at various rates (for example, from low quality to high quality) and is divided into several files and stored in the server 110 (123). A client 120 of FIG. 1 monitors the state of a network 130 (e.g., 'Internet') (122), and determines the rate of the video to be streamed by estimating an available network capacity (121). The conventional process is referred to as adaptive bitrate selection or adaptive bitrate streaming (ABR). In this regard, the client 120 may be a smart phone, a home TV, a game console, a web browser, a DVD player, or the like.

Specifically, in DASH, the media server 110 is essentially an HTTP server that hosts media segments. Media segments that are compressed and stored by the encoder in the server are usually fragments of media having several seconds, and each segment is encoded and stored at various bitrates (e.g., 480, 720$p$, 2K, 4K, etc. related to video playback quality), and such information is listed in a manifest called a Media Presentation Description (MPD).

The MPD is an XML document that provides an index for media segments available in the server 110. The HAS technique implements a rate adaptation logic in the DASH client 120, and makes a request for a segment having an appropriate level from the server if necessary. For example, the client 120 is driven in the form of downloading a segment corresponding to a specific level among the segments described in the MPD from the server 110 using a HTTP GET message.

Here, while the DASH client downloads and plays a video from the server, a currently available network capacity is estimated and used to select the quality level of subsequent segments, and the status information of the buffer operated by the client is used. This operation is also referred to as bitrate switching, and the goal of the client 120 is to keep enough data in the playback buffer to achieve good QoE while preventing video playback interruption. The client 120 downloads in advance the segments to be reproduced after a segment currently being reproduced and stores them in the playback buffer. According to a currently available network bandwidth situation, the quality of segment to be downloaded among segments having various qualities stored in the server 110 is determined. In this case, in general, the bitrate of a previously downloaded segment is used to estimate currently available network bandwidth, and a value obtained by dividing the size of the downloaded segment by a time required to download the corresponding segment is used. In the end, the amount of downloadable data per unit time is regarded as a bitrate at a corresponding point in time and is used as a criterion for selecting the bitrate of a segment to be downloaded immediately. As described above, segments having various levels of bitrates for each video for streaming are generated and stored in the server 110.

The conventional general operation is applicable not only to a single source video streaming service but also a live streaming application such as a video cast for simultaneously transmitting video streams of different scenes, an interactive multi-view streaming service for transmitting a multi-view video shot at different locations through multiple cameras and then enabling the multi-view video to be viewed by user's choice and a multi-view streaming service environment where videos collected through dozens of camera sensor arrays are transmitted and one or more videos are simultaneously transmitted to provide a three-dimensional realistic experience service as if a user is actually in the space. In this case, it is used as a solution to efficiently utilize resources according to the client's playback capability and the condition of the variable bandwidth during transmission and to guarantee the quality of the multi-view video service.

More specifically, unlike single video streaming, in a multi-view service environment, users selectively designate and consume a view among multiple videos transmitted simultaneously, and randomly change a viewport during viewing by movement such as gaze movement or head movement. The most important consideration in providing such an interactive multi-view streaming service is that, when the user's gaze moves and the current viewport is changed, the video corresponding to the moved view is played back within a fast response time without interruption of video playback.

For this purpose, methods of providing viewport switching without delay by downloading images of neighboring views to which the user's gaze may be moved later in addition to a current viewport, in which the user's gaze is staying, and playing previously downloaded images when the user's gaze is moved have been proposed and used. However, these methods require a huge amount of network resources as the number of images to be simultaneously transmitted increases. Therefore, the quality of the main view image on which the current user's gaze is located is maintained as best as possible, and the images corresponding to the neighboring views are downloaded with low quality and used for the purpose of preventing interruption of video playback until the high-quality image for the viewpoint moved when the user's gaze moves is downloaded. At this time, in preparation for gaze movement, the quality of the previously downloaded neighboring images depends on available network resources, and a difference from the quality of the main view images needs to be reduced as much as possible to guarantee user's QoE.

In order to solve the above needs, it is necessary to accurately estimate the currently available network resources, and to be able to select an appropriate quality for each video segment download within the limit. In the adaptive streaming technique, when a client requests to download a specific segment, for data transmission that may be adaptively applied to network capacity with high variability, an average bitrate measured during previous segment download (e.g., downloaded segment size/download time) is used. In this case, when available bandwidth in which the measured value may be utilized is estimated to be lower than an actual value, only a segment having the same average bitrate as the previous segment is selected despite the fact that data transmission with a larger bitrate is possible.

For example, there is a problem in that the currently available bandwidth resource is underestimated due to a TCP transport mechanism during actual segment download. Due to this phenomenon, the smaller the size of the segment, the larger the magnitude of error. That is, when the average transfer rate of the previous segment is used to select the quality of the subsequent segment, since the actual available bandwidth is underestimated, resulting in a problem in that a segment with lower quality than an actual transmittable segment is obtained.

Hereinafter, the problems of the conventional adaptive streaming processing method will be described in detail with reference to FIGS. 2 to 3.

Segments encoded and stored in the server with various quality levels are composed of a set of frames which may be reproduced for a certain period of time (e.g., segment length, calculated in seconds, and segments composed of a set of chunks of tens or hundreds of milliseconds may be used for the purpose of reducing latency). It can be seen that the length of each segment is constant, but, as shown in FIG. 2, due to the VBR characteristics of an encoder, the size (total number of bits) of a segment actually generated for one video stream is highly variable around an average size and the pattern is not uniform.

For example, FIGS. 2 and 3 show changes in sizes of segments corresponding to level 7 (FIG. 2) and level 10 (FIG. 3) among segments generated by encoding one stream with 10 levels. Here, the number of segments generated for each stream was 199, the average size of the segments generated at an encoding rate of 2056 bps (FIG. 2) is 6151480 bits (201) and the average of the segments generated at an encoding rate of 6000 bps (FIG. 3) has a size of 17976064 bits (202).

In a situation where the size of the segment is variable, the average bitrate measured when downloading the segment enables the actual available bandwidth to be underestimated. Accordingly, when a quality level for downloading a subsequent segment is selected based on the average transfer rate of a previous segment, as the size of the previous segment is reduced, the actual transmittable bit rate may be underestimated. In addition, when the quality level of a subsequent segment is determined for each video stream to be transmitted simultaneously, errors in the underestimated available bandwidth are accumulated for each stream, so that there is a problem in that the actual available bandwidth cannot be fully utilized as a whole. This may be a factor of lowering the user's QoE by providing images having lower quality than the actual quality that may be provided.

That is, if the quality of the subsequent segment is determined by referring to the average transfer rate obtained during the previous segment download for each stream, the bandwidth errors underestimated for each stream are accumulated, resulting in downloading a segment having lower quality than actual available quality.

SUMMARY OF THE INVENTION

An object of the present disclosure is to provide an adaptive streaming processing method and apparatus for maximizing bandwidth usage.

An object of the present disclosure is to provide an adaptive streaming transmission method and apparatus for maximizing bandwidth usage.

An object of the present disclosure is to provide an adaptive streaming processing method and apparatus for providing a stream with improved quality.

The technical solution of the present disclosure is to obtain the sizes of downloadable segments by maximally utilizing a transmission time allocated to each stream during the download period, without simply utilizing an average transfer rate of a previous segment to select the quality level of a subsequent segment, in order for simultaneously downloadable segments of a stream to utilize the given time resource as much as possible through one download period.

An adaptive streaming processing method for a multi-view stream according to an embodiment of the present disclosure comprises selecting and downloading an i-th segment of a main view stream with a first quality level, inferring a size of an i-th segment of downloadable neighboring view streams based on a download time and transfer rate of the i-th segment of the main view stream, and selecting a second quality level corresponding to the inferred size of the i-th segment of the neighboring view streams and downloading the i-th segment of the neighboring view streams based on the selected second quality level.

In this case, the first quality level may be selected as a highest level for downloading the i-th segment of the main view stream with highest quality.

In addition, the inferring the size of the i-th segment of the downloadable neighboring view streams may comprise calculating a transfer rate $R_{mv}^{i}$ of the i-th segment of the main view steam, calculating a time $DP_{sv}^{i}$ available for downloading the i-th segment of the neighboring view streams from a download time of the i-th segment of the main view stream and a preset download period, calculating a time $DP_{sv}^{i}(j)$ available for downloading the i-th segment of a j-th neighboring view stream to be downloaded along with the i-th segment of the main view stream, and calculating a size $SS_{sv}^{i}(J)$ of the i-th segment of the j-th neighboring view stream.

The adaptive streaming processing method according to the embodiment of the present disclosure may further comprise a media presentation description (MPD) describing sizes of multi-view stream segments from a server, and selection of a second quality level corresponding to the inferred size of the i-th segment of the neighboring view streams may be based on the MPD.

In addition, from the received MPD, the second quality level may be selected so that a segment having a largest value among segments having sizes smaller than a size of a downloadable segment is selected.

The adaptive streaming processing method according to the embodiment of the present disclosure may further comprise a third quality level for downloading (i+1)-th and subsequent segments of the main view stream based on the downloaded segment of the neighboring view streams.

In this case, the third quality level may be determined based on an average bitrate while downloading the neighboring view streams calculated from the sizes of the downloaded segments of the neighboring view streams and a download time.

In addition, the adaptive streaming processing method may comprise transmitting the determined third quality level to a server and downloading (i+1)-th and subsequent segments of the main view stream corresponding to the third quality level from the server.

An adaptive streaming process method for a multi-view stream according to another embodiment comprises selecting and downloading an i-th segment of a main view stream with a first quality level, based on a download time and transfer rate of the i-th segment of the main view stream, inferring a size of i-th segment of downloadable neighboring view streams, and transmitting information on the inferred size of the i-th segment of the neighboring view streams to a server and downloading the i-th segment of the neighboring view stream corresponding to a second quality level from the server.

An adaptive streaming transmission method for a multi-view stream in a server according to an embodiment of the present disclosure comprises transmitting an i-th segment of a main view stream to a client with a first quality level requested by a client, selecting an i-th segment of a neighboring view stream corresponding to size information of an i-th segment of neighboring view streams received from the client, and transmitting the selected segment to the client. In this case, in selecting the i-th segment of the neighboring view stream, a segment having a largest value among segments having a smaller value than the size information of the i-th segment of the received neighboring view streams among the segments stored in the server is selected. In addition, segment selection parameter (SSP) information may be received from the client along with a segment download request, and a segment to be transmitted may be selected using the received SSP information.

The present disclosure may provide higher QoE to users, by requesting a larger size of a segment that may be actually received by maximally using time resource that may be used to download the i-th segments of all streams to be simultaneously received during a download period, and downloading segments of better quality.

In addition, by maintaining the download period to be utilized as much as possible, the download period maintained in an idle state is minimized, thereby reducing an error probability that the available bandwidth may be overestimated or underestimated in a situation where multiple clients use the service.

It will be appreciated by persons skilled in the art that the effects that can be achieved through the present disclosure are not limited to the above-described effects and other advantages not described herein will be more clearly understood from the following detailed description.

BRIEF DESCRIPTION OF THE DRAWINGS

FIG. 4 shows a multi-view streaming environment according to an embodiment of the present disclosure.

DESCRIPTION OF THE PREFERRED EMBODIMENTS

Figure 1:
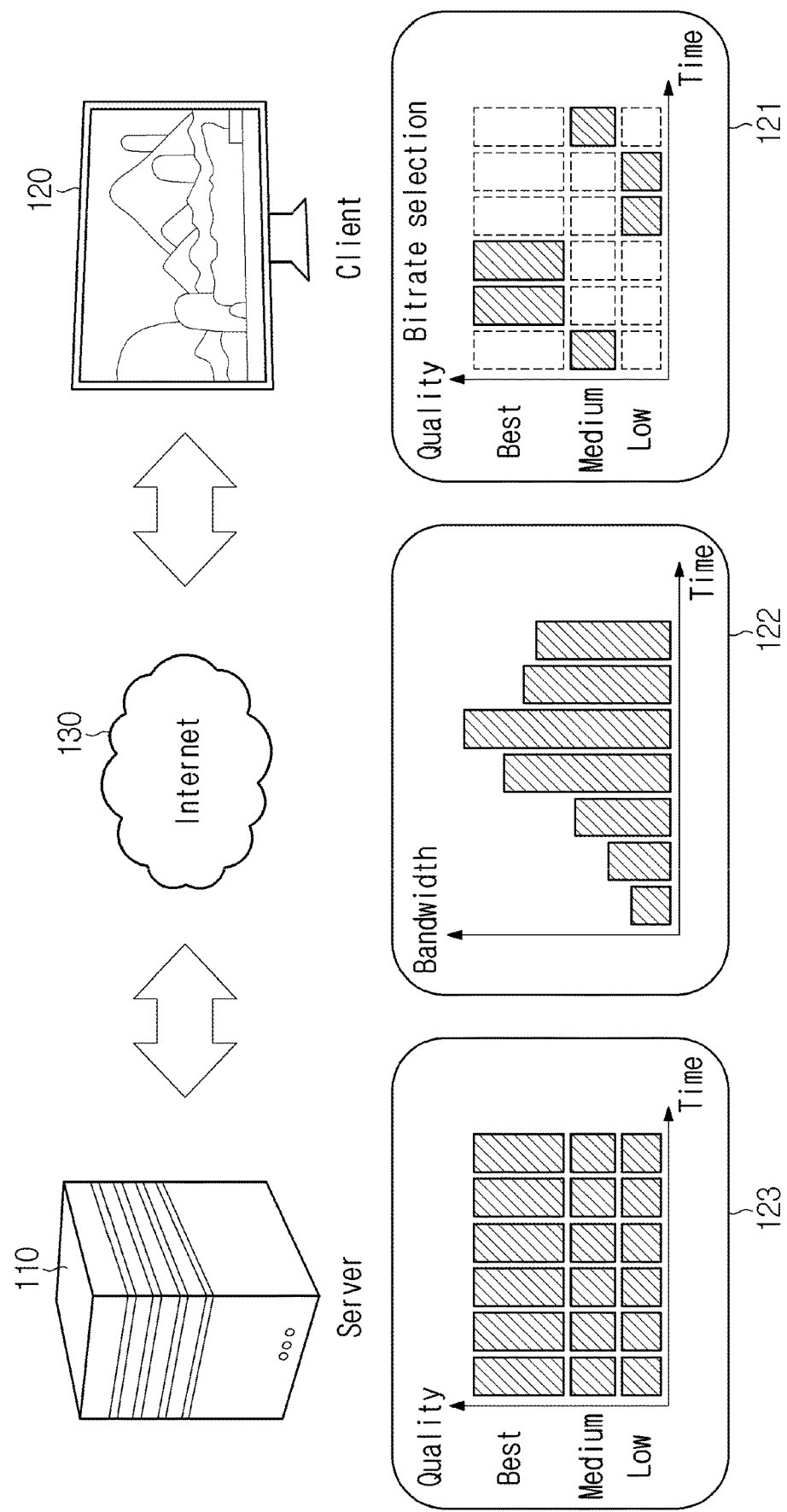
FIGS. 1 to 3 show operation in a conventional general HTTP adaptive streaming system.

Hereinafter, embodiments of the present disclosure will be described in detail with reference to the accompanying drawings so that those of ordinary skill in the art to which the present disclosure pertains can easily implement them. However, the present disclosure may be embodied in several different forms and is not limited to the embodiments described herein.

In describing the embodiments of the present disclosure, if it is determined that a detailed description of a well-known configuration or function may obscure the subject matter of the present disclosure, a detailed description thereof will be omitted. In addition, in the drawings, parts not related to the description of the present disclosure will be omitted, and similar portions are denoted by similar reference numerals.

In the present disclosure, when a component is "connected", "coupled" or "linked" to another component, it may include not only a direct connection relationship but also an indirect connection relationship in which another component is present therebetween. In addition, when a component is said to "include" or "have" another component, it means that another component is not excluded and may be further included unless otherwise stated.

In the present disclosure, the terms such as first, second, etc. are used only for the purpose of distinguishing one component from other components, and, unless otherwise specified, the order or importance between the components is not limited. Accordingly, within the scope of the present disclosure, a first component in one embodiment may be referred to as a second component in another embodiment, and similarly, a second component in one embodiment is referred to as a first component in another embodiment.

In the present disclosure, the components are distinguished from each other in order to clearly describe the characteristics of each component, and it does not necessarily mean that the components are separated. That is, a plurality of components may be integrated to form one hardware or software unit, or one component may be distributed to form a plurality of hardware or software units.

Accordingly, even if not specifically mentioned, such integrated or distributed embodiments are also included in the scope of the present disclosure.

In the present disclosure, components described in various embodiments do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

The advantages and features of the present disclosure and the way of attaining them will become apparent with reference to embodiments described below in detail in conjunction with the accompanying drawings. However, the present disclosure is not limited to the embodiments described below, but may be implemented in various different forms, and only the present embodiments are provided to make the disclosure of the present disclosure complete and to fully convey the scope of the present disclosure to a person having ordinary skill in the art to which the present disclosure pertains.

Hereinafter, embodiments of the present disclosure will be described in detail with reference to FIGS. 4 to 9.

The present disclosure proposes an adaptive streaming technique for improving user's QoE by effectively utilizing variable network bandwidth in a situation where several video streams need to be simultaneously transmitted at one time. For the detailed description of the disclosure, as shown in FIG. 4, an embodiment in which, images captured through a 5×5 camera lens centered on the user's viewpoint are simultaneously transmitted as a main video stream and neighboring video streams will be described. However, the application of the present disclosure is not limited to this embodiment and is generally applicable to streaming in all cases where two or more video streams need to be simultaneously transmitted at any moment.

In general, in the adaptive streaming technique, operation is performed by linking the buffer state and the average bitrate of a previous segment together. In the present disclosure, a portion associated with an buffer operation algorithm is not discussed and a new method is proposed for a function related to network bandwidth estimation. That is, when operation is performed to interwork with a buffer management method, steps for interworking may be additionally included.

FIG. 4 shows a situation where an image input through a $13^{th}$ camera among images captured through a total of 5×5 (25) cameras shows a user's current viewpoint (i.e., main view) Mv 211 and eight video streams corresponding to neighboring views 212 from Sv1 to Sv8 centered thereon are downloaded in preparation for movement of the user's viewport after a current point in time. At this time, the main view is guaranteed to be provided in the possible best quality, and the neighboring view streams are played back once with low quality to prevent interruption of video playback until a high-quality video for the viewport moved when the user's gaze moves arrives.

In this regard, in the bitrate adaptive algorithm, when a segment playable at a client's service start time or stored in a buffer is below a certain level set by the system, a next segment is downloaded as soon as previous segment download is finished, raising the amount of segments secured in the buffer to a certain level within a short time. Thereafter, when the amount of segments stored in the buffer rises to a certain level, segment download for video playback is executed periodically. In most cases, this download period is the length of the segment (it is generally 1 to 3 seconds, but, in order to minimize transmission delay, chunks of tens or hundreds of milliseconds are used, and segments composed of a set of these chunks are used), and may be set to the same value in the entire period. In both of these cases, when a download time comes, the quality of the segment to be downloaded is determined, and then a request to download the segment with the corresponding quality is transmitted to a server. An embodiment executable by applying such operation to a multi-view streaming environment as in FIG. 4 will be described with reference to FIG. 5.

Figure 5:
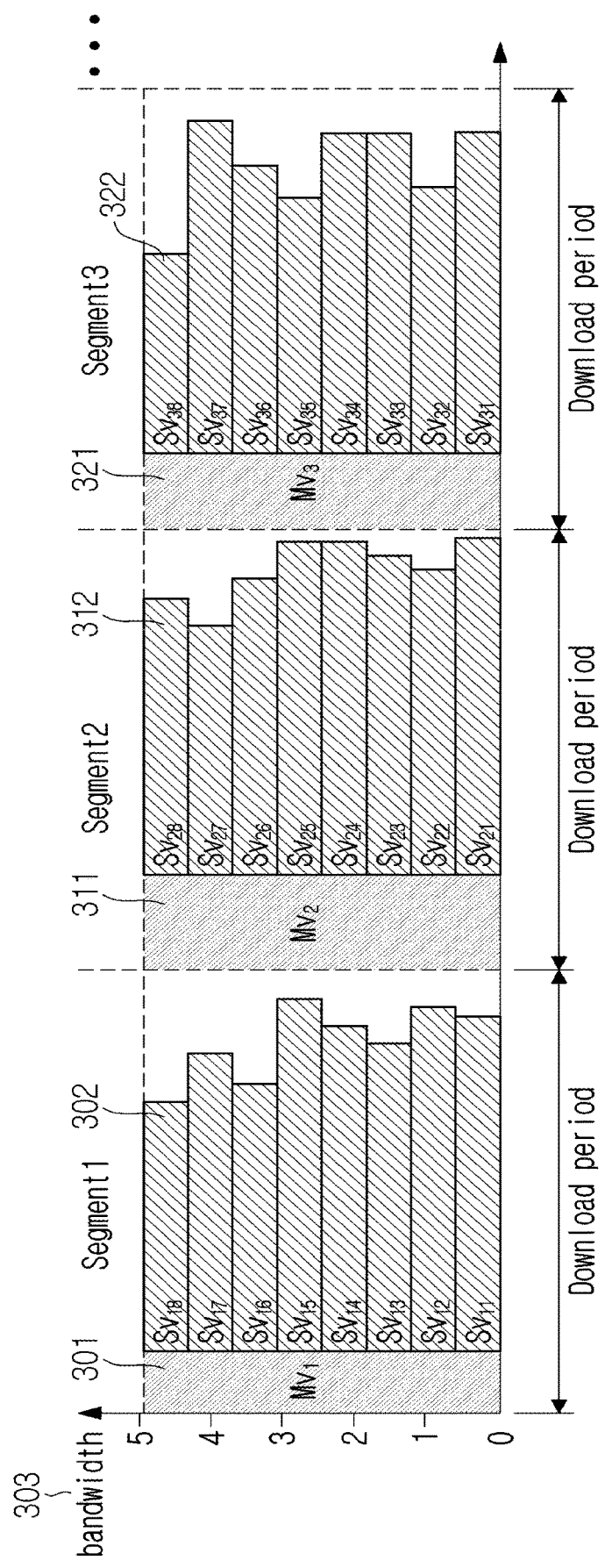
FIG. 5 shows a multi-view streaming example according to an embodiment of the present disclosure.

FIG. 5 shows that the segments 301, 311, and 321 of the main view stream are preferentially downloaded by using the entire available bandwidth 303 during a download period having a specific size. The time remaining after downloading the segment of the main view stream is multiplied by an average bitrate $R_{mv}$ obtained through the segment download of the main view stream to calculate the data size for downloading the segments 302, 312, and 322 of the neighboring view streams, and is divided by the number of neighboring views to calculate the size of the downloadable segment for each neighboring view stream. In this way, the segments of the main view stream, which are highly likely to be reproduced until the user's viewport movement is detected, are downloaded in a short time and are waiting for playback, and the remaining download period is maintained to be utilized as much as possible in the neighboring view stream download, thereby preventing a situation where the download period is maintained in an idle state. As a result, through reduction of the idle period, it is possible to reduce errors caused by overestimating or underestimating the available bandwidth in a situation where multiple clients use a service.

Here, the download period DP may be a segment length (e.g., usually 1 to 3 seconds, or a chunk or a group of chunks in units of tens or hundreds of milliseconds) or may use a time arbitrarily designated by the system. In this case, unlike the conventional method in which the download period DP length is fixed, according to an embodiment of the present disclosure, the download period DP does not have a fixed length but may have a variable length in some cases.

The above-described process will be described using detailed equations and examples as follows.

When one view image is composed of Ns segments ($1 \leq i \leq Ns$), the download time of an i-th segment of the main view stream is $DT_{mv}^{i}$, and the size of the i-th segment of the main view stream is $SS_{mv}^{i}$, the transfer rate $R_{mv}^{i}$ of the i-th segment of the main view stream is as follows.

$$R_{mv}^{i} = SS_{mv}^{i}/DT_{mv}^{i}$$

In addition, a time $DP_{sv}^{i}$ available for downloading the i-th segments of the neighboring view streams and a total size $SS_{sv}^{i}$ of the i-th segments of the neighboring view streams are as follows.

$$DP_{sv}^{i} = DP - DT_{mv}^{i}$$

$$SS_{sv}^{i} = DP_{sv}^{i} \times R_{mv}^{i}$$

Here, using an average transfer rate obtained from the segment download of the main view stream to select the segment quality of the neighboring view stream means estimating the entire bandwidth available during the download period. This is because, as the size of the segment increases, errors according to the TCP transfer scheme included in the obtained average bitrate may be minimized.

Accordingly, according to an embodiment of the present disclosure, the adaptive streaming processing method for the multi-view stream may be performed in the following steps.

1. A first segment of the stream corresponding to the main view is selected and downloaded at a highest level.
2. A transfer rate $R_{mv}{}^i$ of the i-th segment of the main view stream is calculated.
3. A time $DP_{sv}{}^i$ available for downloading the i-th segments of the neighboring view streams is calculated.
4. When the number of neighboring view streams to be downloaded is $N_{sv}$ (e.g., 8), a time available for downloading the i-th segment download of a j-th (0 to 7) neighboring view stream to be downloaded together with the i-th segment of the main view stream is calculated.

$$DP_{sv}{}^i(j)=DP_{sv}{}^i/N_{sv}, 1 \leq j \leq N_{sv}, 1 \leq i \leq N_s$$

$$DP_{sv}^i = \sum_{i=1}^{N_{sv}} DP_{sv}^i(j)$$

5. The size $SS_{sv}{}^i(j)$ of the i-th segment of the j-th neighboring view stream requested by the client is calculated.

$$SS_{sv}{}^i(j)=SS_{sv}{}^i/N_{sv}$$

Here, according to an embodiment of the present disclosure, the client may transmit the obtained value $SS_{sv}{}^i(j)$ to the server, and the server may select and transmit a largest segment among segments smaller than the corresponding value among the stored multiple-level segments. That is, since the client transmits information on the maximum size of a receivable segment to the server for reference for segment selection, and the server selects and transmits the segment having the largest value among the segments having values smaller than the value presented by the client among the stored segments, a function module for segment selection shall be configured in the server. This will be described later in detail with reference to FIG. 6.

In addition, according to another embodiment of the present disclosure, the client may directly determine the quality level of a segment to be downloaded without transmitting the obtained $SS_{sv}{}^i(j)$ value to the server and request designation of the segment from the server. In this case, the server adds a field indicating the size of each segment to an MPD and transmit it to the server, and, when the size of downloadable data is determined for each neighboring view, the client may operate to select a suitable segment by referring to segment information described in the MPD and make a request from the server. This will be described later in detail with reference to FIG. 6.

In addition, after downloading the neighboring view stream, when the second and subsequent segments of the main view stream are downloaded, a method for selecting a quality level of a segment is as follows.

1. When the neighboring view stream is downloaded, the size $SS_{sv}{}^i(j)$ of the downloaded segment and a download time $DP_{sv}{}^i(j)$ are measured and stored.

$$SS_{sv}^i = \sum_{i=1}^{N_{sv}} SS_{sv}^i(j)$$

2. The sizes of the segments of all neighboring view (e.g., 8) streams and the download time are all added up and the average bitrate during the neighboring view stream download period is calculated using these values.

$$R_{ss}{}^i = SS_{sv}{}^i / DP_{sv}{}^i$$

3. The client requests the download of the segment by designating the quality of the segment of the main view stream based on the calculated $R_{ss}{}^i$ value.

Figure 6:
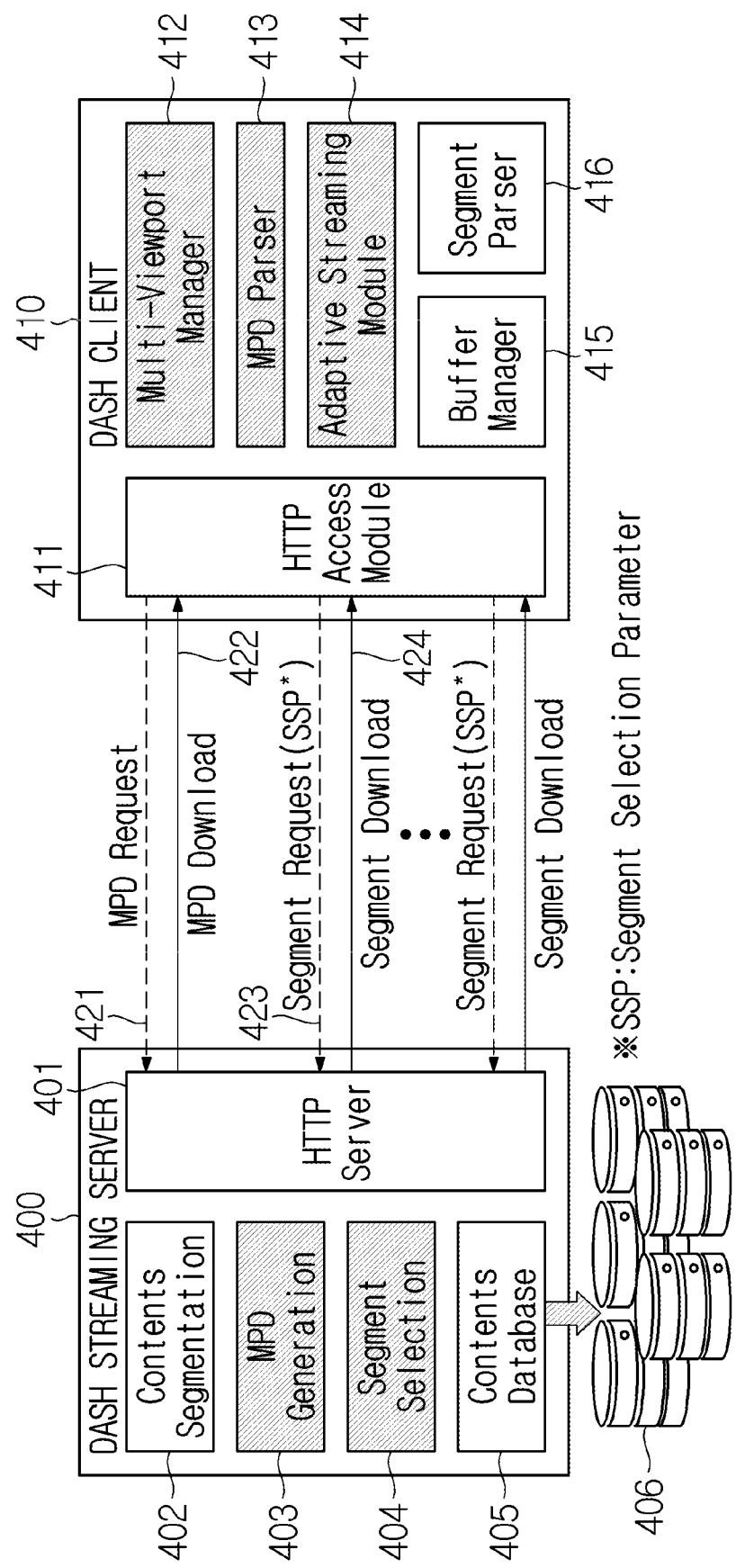
FIG. 6 shows a DASH server and client structure according to an embodiment of the present disclosure.

FIG. 6 shows a DASH client and server structure to which an adaptive streaming processing method and transmission method for a multi-view stream is applied, according to an embodiment of the present disclosure. That is, the above-described bitrate adaptive algorithm is installed and operated on the DASH server/client, and the configuration of the apparatus is shown in FIG. 6.

In FIG. 6, additional function modules for applying an algorithm corresponding to the embodiment of the present disclosure described above under the structure of the DASH server 400 and the client 410 are defined. In particular, the shaded function block modules 412, 413, 414, 403 and 404 of FIG. 6 correspond to them. The modules may be integrated in a general HAS operation module or may be configured as separate modules. In addition, although the module of each function block is denoted by a specific name for convenience of description in the present disclosure, the embodiment of the present disclosure is not limited thereto.

The DASH server 400 includes a function 402 for segmenting a compressed stream through an encoder to enable adaptive transmission by the HAS, and stores and manages it in databases 405 and 406. The segmented video stream fragments encoded on-demand or in real time are transmitted through HTTP server/client communication modules 401 and 411 according to the request of the client 410 as appropriate segments.

In this case, in applying the method of the present disclosure, in the structure in which the client 410 determines the quality of a segment, a function 403 for describing the size of each segment in addition to the existing MPD description shall be added.

On the other hand, in applying the method of the present disclosure, in the structure in which the server 400 determines the quality of a segment, a segment selection parameter (SSP) transmitted along with a segment download request 423 from the client is used to perform a function 404 for selecting a segment to be transmitted (404) and is transmitted to the requesting client (424).

In order to realize the method of the present disclosure, the DASH client 410 may include a multi-viewport manager 421 for managing a group of main and neighboring views to be downloaded within one download period, configuring the views according to the user's current viewport position, and making a stream transmission request. In addition, the DASH client 410 further includes an adaptive streaming module 414 for performing a segment size-based segment selection algorithm as described above. In this case, the adaptive streaming module 414 interworks with a buffer management module 415 for a bitrate adaptive algorithm operated by an existing DASH client and a segment parser 416 for interpreting segments downloaded by the adaptive streaming algorithm to play the video.

According to the embodiment of the present disclosure, when realized in a structure in which the client selects a segment to be downloaded, a MPD parser 413 performs a function for reading the size information of each segment in the MPD received from the server and comparing it with the size of a currently downloadable segment to select the best segment.

Figure 7:
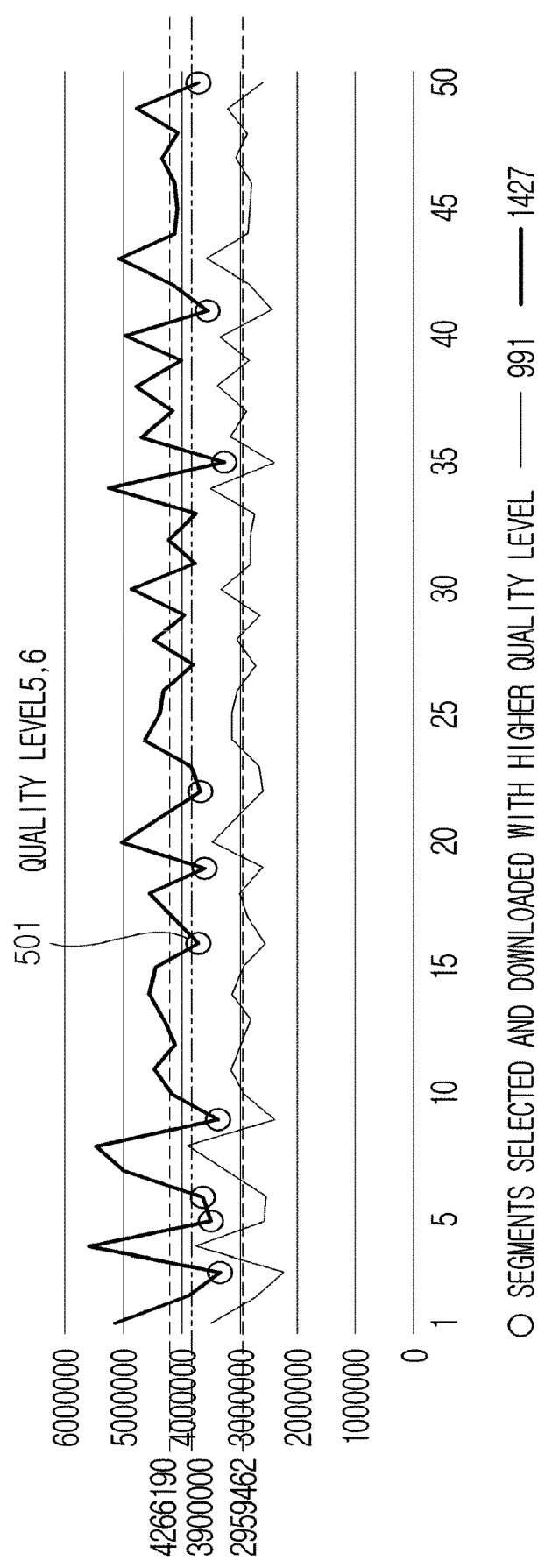
FIG. 7 shows experimental results of applying an adaptive streaming processing method according to an embodiment of the present disclosure.

FIG. 7 shows experimental results of applying a segment size-based segment selection algorithm as an embodiment of the present disclosure. Hereinafter, the effect of the embodiment of the present disclosure will be described in detail with reference to FIG. 7.

Figure 2:
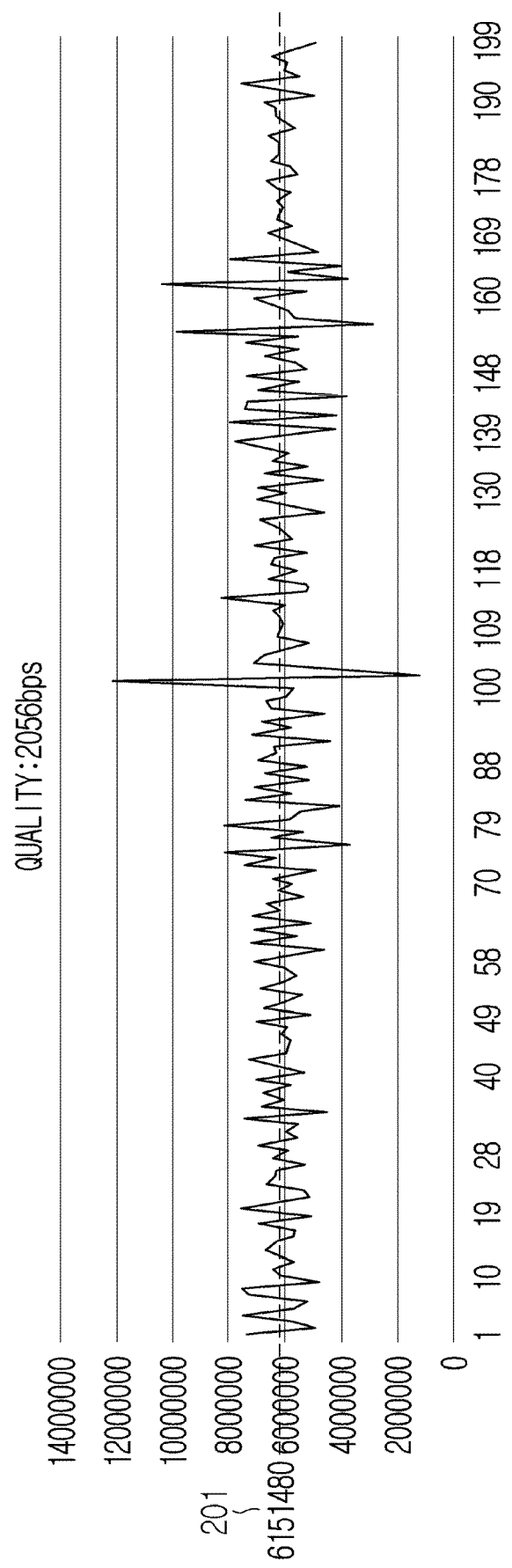
Figure 3:
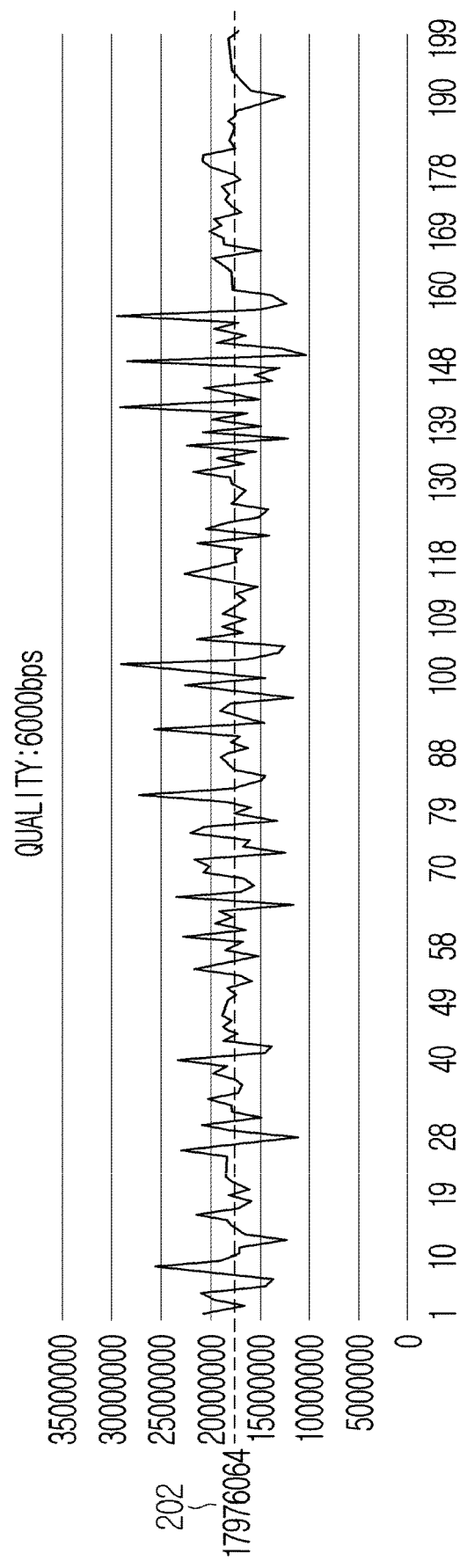

First, as described above with reference to FIGS. 2 to 3, it can be seen that segments generated with one quality level from the encoder have a large deviation in actual size. Because of these characteristics, when the segments constituting one stream stored in the server are encoded and stored, it can be seen that the segments with respective levels have a larger variation centered on an average value when comparing the sizes of the segments with the quality levels 5 and 6 in FIG. 7.

At this time, when the size of the downloadable segment measured by the client reaches a certain point between the averages of the two levels, the levels of the segments to be selected at any moment vary for each segment.

For example, in the case of the conventional method, the client selects a quality level of a stream to be downloaded and operates in a manner of downloading segments with the corresponding level regardless of whether the sizes of the segments belonging to the corresponding level are small or large. On the other hand, if the method proposed by the present disclosure is applied, it is possible to download a segment with a better level at an arbitrary moment while utilizing the same network resource, leading to improvement of the user's QoE.

Specifically, for example, FIG. 7 shows the size distribution of segments with fifth and sixth quality levels among video streams encoded to have a total of 10 quality levels. In this case, the encoding rate of level 5 is 991 bps (thin solid line), and the encoding rate of level 6 is 1427 bps (bold solid line). Here, the segment average sizes are approximately 2.9 megabits ('2959462') and 4.3 megabits ('4266190'), respectively. However, it can be seen that the variation range of each segment size is large based on this average value.

In this situation, if the conventional method is used, the client selects a stream for one quality level in a manner in which it is 5 when the level is 5 and is 6 if the level is 6, whereas, according to the proposed method according to the embodiment of the present disclosure, it is possible to select a higher quality level based on the segment size for the stream of the neighboring view. For example, referring to FIG. 7, when the client selects a segment to be downloaded by selecting a segment size limit value for the neighboring view stream, if the segment size of each downloadable neighboring view stream calculated by the client is 3.9 megabits, the segments 501 corresponding to 10 among 50 segments shown in FIG. 7, and encoded with the quality level 6, may be downloaded. This means that about 20% of the segments will downloaded with higher quality level by one level compared to the case of using the existing method, and it can be seen that the user's QoE can be greatly improved.

Figure 8A:
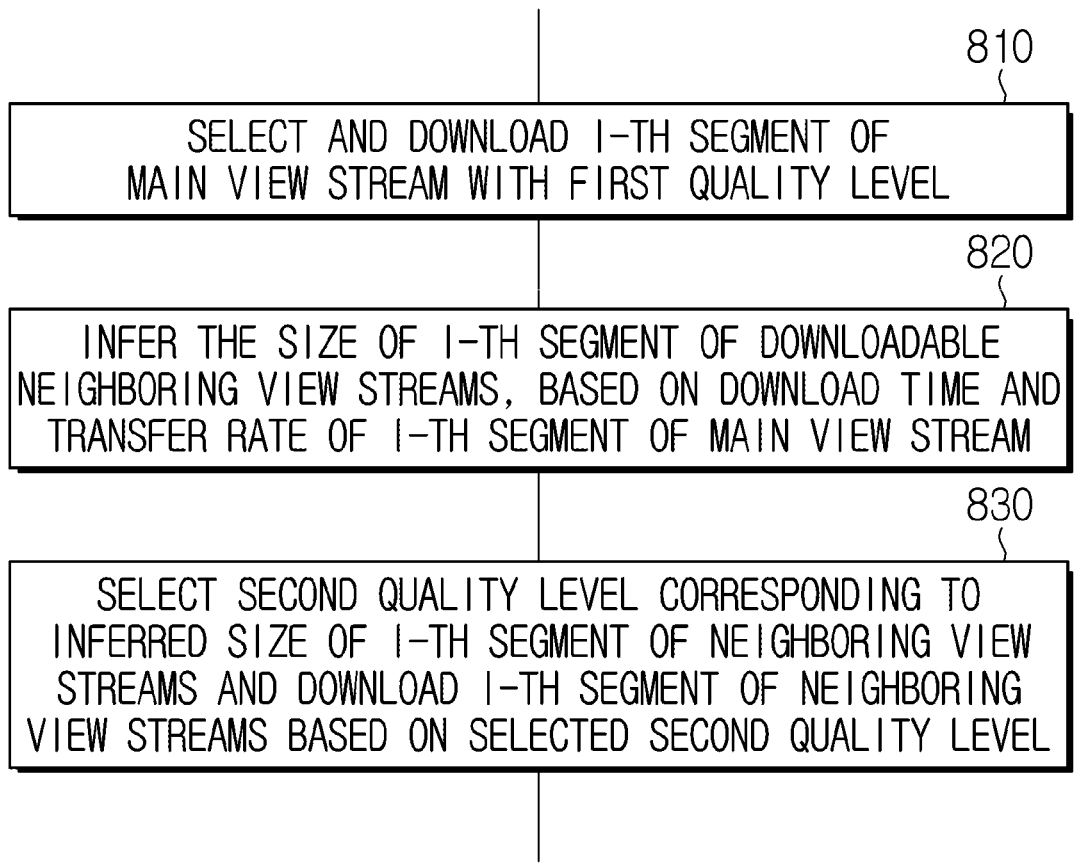
FIGS. 8A and 8B are diagrams each showing an adaptive streaming processing method for a multi-view stream according to an embodiment of the present disclosure.
Figure 8B:
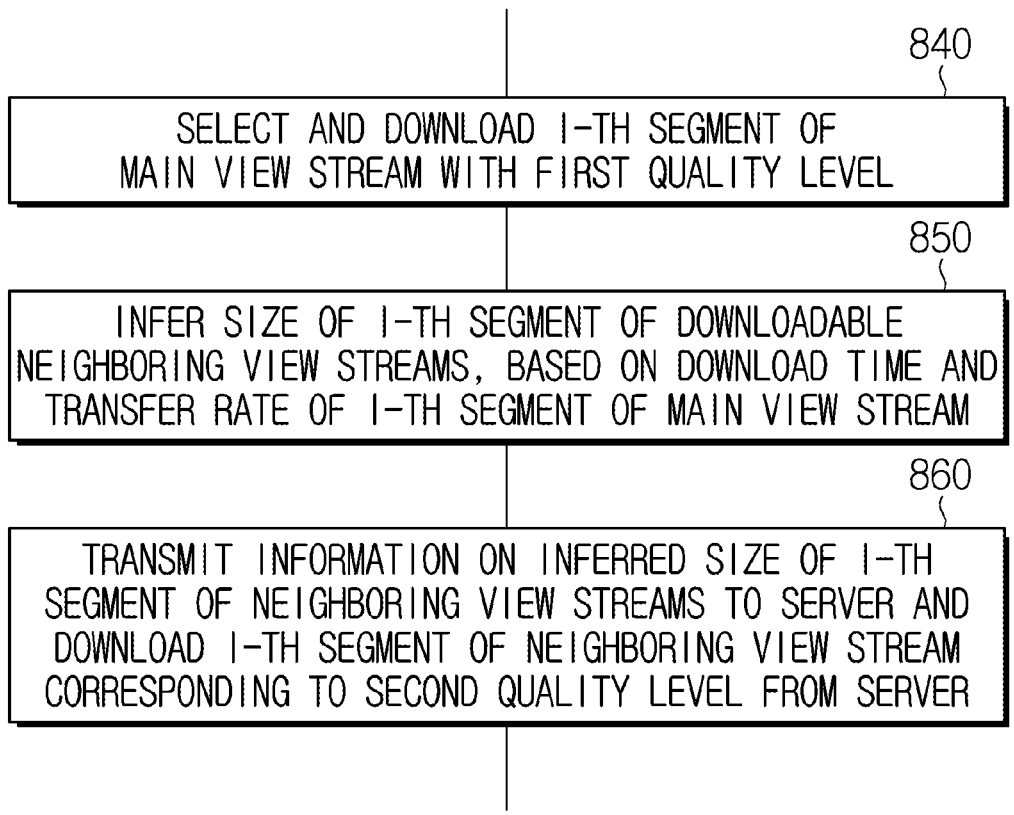
Figure 8C:
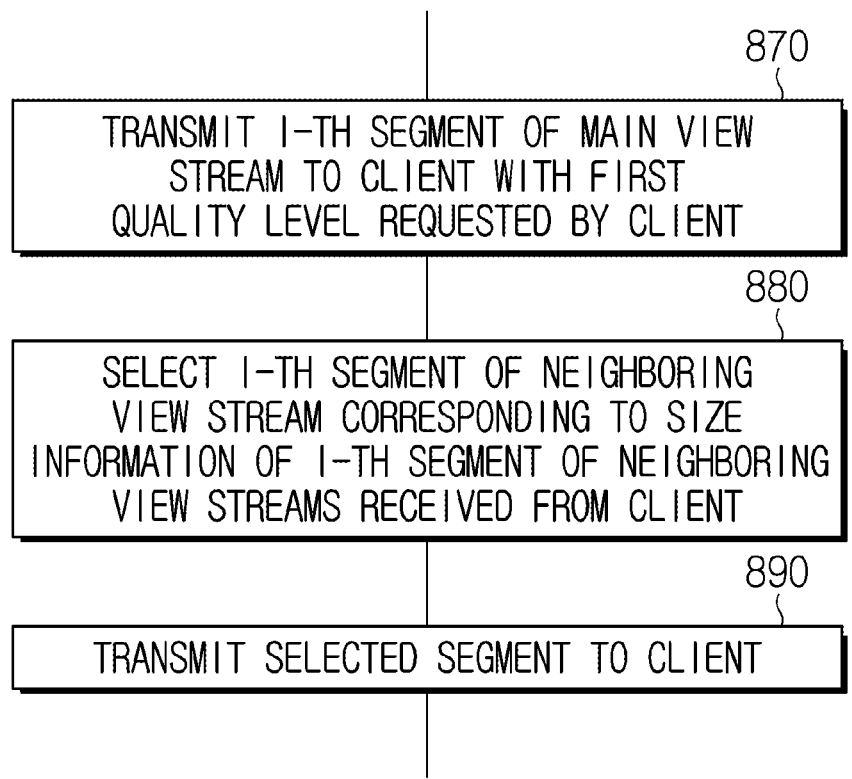
FIG. 8C shows an adaptive streaming transmission method for a multi-view stream in a server, according to another embodiment of the present disclosure.

FIGS. 8A and 8B are diagrams each showing an adaptive streaming processing method for a multi-view stream according to an embodiment of the present disclosure. In addition, FIG. 8C shows an adaptive streaming transmission method for a multi-view stream in a server, according to another embodiment of the present disclosure.

FIG. 8A relates to a case in which a client selects a quality level of a neighboring view stream, according to an embodiment of the present disclosure. Specifically, it includes step 810 of selecting and downloading an i-th segment of a main view stream with a first quality level, step 820 of, based on a download time and a transfer rate of the i-th segment of the main view stream, inferring the size of the i-th segment of downloadable neighboring view streams, and step 830 of selecting a second quality level corresponding to the inferred size of i-th segment of the inferred neighboring view streams and downloading the i-th segment of the neighboring view streams based on the selected second quality level.

Specifically, step 810 may be, for example, a step of selecting and downloading the i-th segment of the main view stream with the first quality level. Here, the first quality level is selected as the highest level for downloading the i-th segment of the main view stream with the highest quality.

Also, step 820 may include calculating the transfer rate of the i-th segment of the main view stream, calculating a time $DP_{sv}^{i}$ available for downloading the i-th segment of the neighboring view streams from a download time of the i-th segment of the main view stream and a preset download period, calculating a time $DP_{sv}^{i}(j)$ available for downloading the i-th segment of a j-th neighboring view stream to be downloaded along with the i-th segment of the main view stream, and calculating the size $SS_{sv}^{i}(j)$ of the i-th segment of the j-th neighboring view stream.

In addition, step 830 may further include receiving a media presentation description (MPD) describing the size of the multi-view stream segments from the server, and selection of a second quality level corresponding to the inferred size of the i-th segment of the neighboring view stream may be determined based on the MPD. In addition, from the received MPD, the second quality level is selected so that a segment having a largest value among segments having sizes smaller than a size of a downloadable segment is selected.

FIG. 8B relates to a case in which a server selects a quality level of a neighboring view stream according to another embodiment of the present disclosure. Specifically, it includes step 840 of selecting and downloading an i-th segment of a main view stream with a first quality level, step S850 of, based on a download time and transfer rate of the i-th segment of the main view stream, inferring a size of i-th segment of downloadable neighboring view streams, and step 860 of transmitting information on the inferred size of the i-th segment of the neighboring view streams to the server and downloading the i-th segment of the neighboring view stream corresponding to a second quality level from the server.

In this case, step 840 is equal to step 810, and step 850 performs the same function as step 820. On the other hand, for step 860, the server adds a field indicating the size of each segment to the MPD transmitted to the client, and, when the size of the downloadable data for each neighboring view is determined, the client selects an appropriate segment by referring to the segment information described in the MPD based on the determined size and requests it from the server.

FIG. 8C shows an adaptive streaming transmission method for a multi-view stream in a server, according to another embodiment of the present disclosure. Specifically, it includes step 870 of transmitting an i-th segment of a main view stream to a client with a first quality level requested by the client, step 880 of selecting an i-th segment of a neighboring view stream corresponding to size information of an i-th segment of neighboring view streams received from the client and step 890 of transmitting the selected segment to the client. Here, in step 880, operation for selecting a segment having a largest value among segments having a smaller value than the size information of the i-th segment of the received neighboring view streams among the segments stored in the server is performed.

Figure 9:
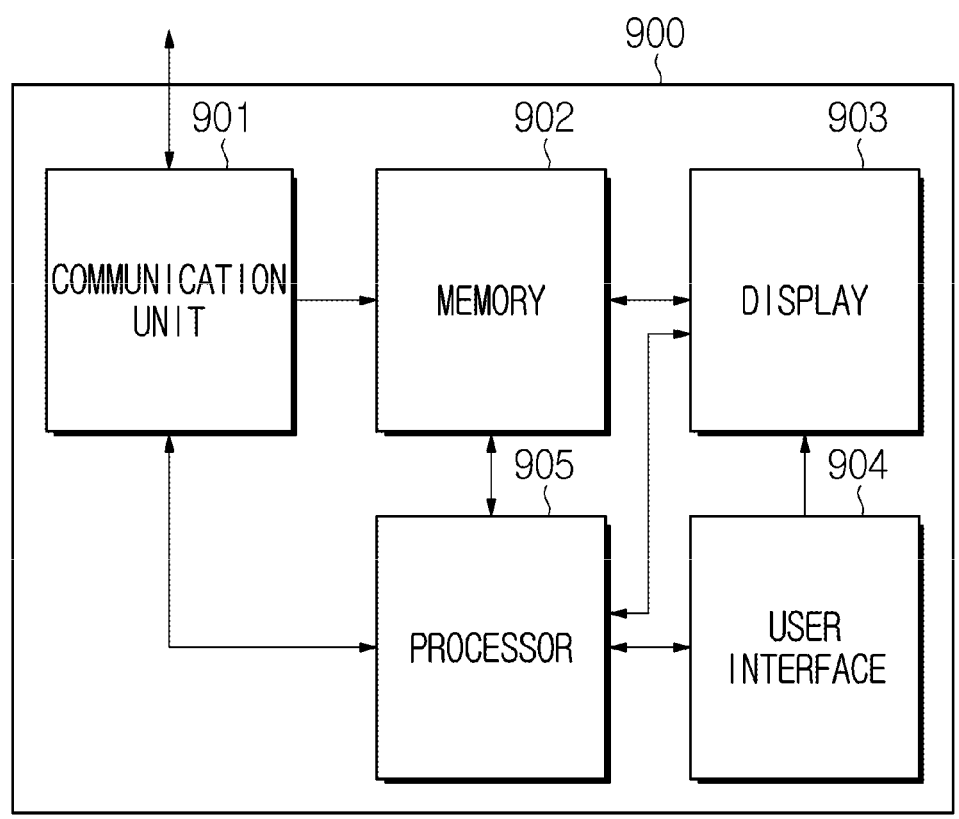
FIG. 9 is a diagram illustrating an adaptive streaming processing apparatus 900 for a multi-view stream according to another embodiment of the present disclosure.

FIG. 9 is a diagram showing an adaptive streaming processing apparatus 900 for a multi-view stream according to another embodiment of the present disclosure. The apparatus 900 of FIG. 9 may include a communication unit 901, a memory 902, a display 903, a user interface 904, and a processor 905. In addition, other components not shown in FIG. 9 may be further included, and the present disclosure is not limited to the above-described embodiment.

More specifically, the adaptive streaming processing apparatus for the multi-view stream of FIG. 9 may be a user terminal, a smartphone, a laptop and a portable personal information apparatus for performing the above-described multi-view adaptive streaming processing method. The present disclosure is not limited to a particular article.

In this case, as an example, the memory 902 may be a non-removable memory or a removable memory. In addition, as an example, various display methods such as LED, OLED, QLED, etc. may be applied to the display 903, and the present disclosure is not limited to the above-described embodiment.

In addition, as an example, the communication unit 901 may include a communication circuit, and may communicate with an external device based thereon.

In addition, as an example, the processor 905 may be at least one of a general-purpose processor, a digital signal processor (DSP), a DSP core, a controller, a microcontroller, application specific integrated circuits (ASICs), field programmable gate array (FPGA) circuits, other types of integrated circuits (ICs) or one or more microprocessors associated with state machine. That is, the processor 905 may be a hardware/software configuration for performing the adaptive streaming processing method for the multi-view stream according to the present disclosure described above.

For example, the processor 905 may communicate with other devices through the communication unit 901. For example, the communication unit 901 may transmit an RF signal through an antenna, and may transmit a signal based on various communication networks. Here, as an example, as an antenna technology, MIMO technology, beamforming, etc. may be applied, and it is not limited to the above-described embodiment. In addition, a signal transmitted and received through the communication unit 901 may be modulated, demodulated and controlled by the processor 905, and is not limited to the above-described embodiment.

In addition, as an example, the user interface 904 is used as a means for transmitting a user command to the processor 904 or the display 903. For example, the above-described user view switching request command may be received and transmitted to the processor 904 to be used as an input for determining a segment bitrate for multi-view video streaming processing.

In order to implement the method according to the present disclosure, other steps may be included in addition to the illustrated steps, steps other than some embodiments may be included, or additional other steps may be included except for some steps.

Various embodiments of the present disclosure do not list all possible combinations, but are intended to describe representative aspects of the present disclosure, and the details described in various embodiments may be applied independently or in combination of two or more.

In addition, various embodiments of the present disclosure may be implemented by hardware, firmware, software, or a combination thereof. For implementation by hardware, it may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, microcontrollers, microprocessors, and the like.

The scope of the present disclosure includes software or machine-executable instructions (e.g., operating system, application, firmware, program, etc.) that cause operation according to the method of various embodiments to be executed on an apparatus or computer, and a non-transitory computer-readable medium storing such software and instructions and the like executable on an apparatus or computer.

The invention claimed is:

1. An adaptive streaming processing method for a multi-view stream, comprising:
    selecting and downloading an i-th segment of a main view stream with a first quality level;
    inferring a size of an i-th segment of downloadable neighboring view streams of the main stream based on a download time and transfer rate of the i-th segment of the main view stream; and
    selecting a second quality level corresponding to the inferred size of the i-th segment of the neighboring view streams and downloading the i-th segment of the neighboring view streams based on the selected second quality level.

2. The adaptive streaming processing method of claim 1, wherein the first quality level is selected as a highest level for downloading the i-th segment of the main view stream with highest quality.

3. The adaptive streaming processing method of claim 1, wherein the inferring the size of the i-th segment of the downloadable neighboring view streams comprises:
    calculating a transfer rate of the i-th segment of the main view steam;
    calculating a time available for downloading the i-th segment of the neighboring view streams from a download time of the i-th segment of the main view stream and a preset download period;
    calculating a time available for downloading the i-th segment of a j-th neighboring view stream to be downloaded along with the i-th segment of the main view stream; and
    calculating a size of the i-th segment of the j-th neighboring view stream.

4. The adaptive streaming processing method of claim 1, further comprising a media presentation description (MPD) describing sizes of multi-view stream segments from a server,
    wherein selection of a second quality level corresponding to the inferred size of the i-th segment of the neighboring view streams is based on the MPD.

5. The adaptive streaming processing method of claim 4, wherein, from the received MPD, the second quality level is selected so that a segment having a largest value among segments having sizes smaller than a size of a downloadable segment is selected.

6. The adaptive streaming processing method of claim 1, further comprising a third quality level for downloading (i+1)-th and subsequent segments of the main view stream based on the downloaded segment of the neighboring view streams.

7. The adaptive streaming processing method of claim 6, wherein the third quality level is determined based on an average bitrate while downloading the neighboring view streams calculated from the sizes of the downloaded segments of the neighboring view streams and a download time.

8. The adaptive streaming processing method of claim 7, comprising transmitting the determined third quality level to a server and downloading (i+1)-th and subsequent segments of the main view stream corresponding to the third quality level from the server.

9. An adaptive streaming process method for a multi-view stream in a client, comprising:
   selecting and downloading an i-th segment of a main view stream with a first quality level;
   based on a download time and transfer rate of the i-th segment of the main view stream, inferring a size of i-th segment of downloadable neighboring view streams of the main stream; and
   transmitting information on the inferred size of the i-th segment of the neighboring view streams to a server and downloading the i-th segment of the neighboring view stream corresponding to a second quality level from the server.

10. The adaptive streaming processing method of claim 9, wherein the first quality level is selected as a highest level for downloading the i-th segment of the main view stream with highest quality.

11. The adaptive streaming processing method of claim 9, wherein the inferring the size of the i-th segment of the downloadable neighboring view streams comprises:
   calculating a transfer rate of the i-th segment of the main view steam;
   calculating a time available for downloading the i-th segment of the neighboring view streams from a download time of the i-th segment of the main view stream and a preset download period;
   calculating a time available for downloading the i-th segment of a j-th neighboring view stream to be downloaded along with the i-th segment of the main view stream; and
   calculating a size of the i-th segment of the j-th neighboring view stream.

12. The adaptive streaming processing method of claim 9, further comprising determining a third quality level for downloading (i+1)-th and subsequent segments of the main view stream based on the downloaded segment of the neighboring view streams.

13. The adaptive streaming processing method of claim 12, wherein the third quality level is determined based on an average bitrate while downloading the neighboring view streams calculated from the sizes of the downloaded segments of the neighboring view streams and a download time.

14. The adaptive streaming processing method of claim 13, comprising transmitting the determined third quality level to a server and downloading (i+1)-th and subsequent segments of the main view stream corresponding to the third quality level from the server.

15. An adaptive streaming transmission method for a multi-view stream in a server, comprising:
   transmitting an i-th segment of a main view stream to a client with a first quality level requested by a client;
   selecting an i-th segment of a neighboring view stream corresponding to size information of an i-th segment of neighboring view streams received from the client, a segment having a largest value among segments having a smaller value than the size information of the i-th segment of the received neighboring view streams among the segments stored in the server being selected; and
   transmitting the selected segment to the client,
   wherein the size information of the i-th segment of the neighboring view streams is determined based on a download time and transfer rate of the i-th segment of the main view stream.

16. The adaptive streaming transmission method of claim 15, wherein segment selection parameter (SSP) information is received from the client along with a segment download request, and a segment to be transmitted is selected using the received SSP information.

* * * * *